United States Patent [19]

Hauler et al.

[11] 4,217,512
[45] Aug. 12, 1980

[54] APPARATUS FOR GENERATING A PULSE WHEN A FIRST MEMBER PASSES A SECOND MEMBER USING PERMANENT MAGNETS WITH DIFFERENT STRENGTHS

[75] Inventors: Peter Hauler, Karlsruhe; Wolfgang Bremer, Ettlingen; Karl-Ernst Weiss; Frieder Heintz, both of Stutensee, all of Fed. Rep. of Germany

[73] Assignee: Robert Bosch GmbH, Stuttgart, Fed. Rep. of Germany

[21] Appl. No.: 30,723

[22] Filed: Apr. 17, 1979

[30] Foreign Application Priority Data

Apr. 19, 1978 [DE] Fed. Rep. of Germany ....... 2817010

[51] Int. Cl.² ............................................. H02K 21/38
[52] U.S. Cl. .................................... 310/155; 310/168
[58] Field of Search ............................. 310/168–171, 310/152, 154, 155, 156, 75 R; 123/146.5 A, 148 E

[56] References Cited

U.S. PATENT DOCUMENTS

| | | | |
|---|---|---|---|
| 3,230,407 | 1/1966 | Marsh, Jr. ............................ | 310/168 |
| 3,458,741 | 7/1969 | Woodward ...................... | 310/168 X |
| 3,780,313 | 12/1973 | Wiegand ........................... | 310/168 X |
| 3,969,644 | 7/1976 | Nowak .................................. | 310/152 |
| 3,983,430 | 9/1976 | Howard ............................ | 310/168 X |
| 4,157,482 | 6/1979 | Kakinuma ........................... | 310/155 |

*Primary Examiner*—Mark O. Budd
*Attorney, Agent, or Firm*—Frishauf, Holtz, Goodman & Woodward

[57] ABSTRACT

A Wiegand wire is placed within the magnetic field generated by a first and second permanent magnet. The first permanent magnet has a field strength exceeding that of the second permanent magnet and the polarity of its magnetic field is opposite that of the second magnet. A rotor having segments of magnetic shielding alternating with slots is rotated between the Wiegand wire and the first magnet. When the magnetic shielding is between the first magnet and the Wiegand wire, the latter is exposed only to the magnetic field of the second permanent magnet. In a second position of the rotor, the Wiegand wire is exposed to both magnetic fields. Since the second permanent magnet generates a stronger field than the first, the direction of magnetization in the Wiegand wire changes abruptly causing a pulse to be generated in pick-up coil 4.

5 Claims, 1 Drawing Figure

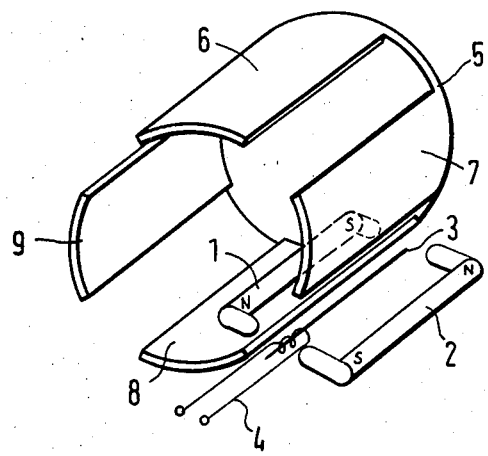

APPARATUS FOR GENERATING A PULSE WHEN A FIRST MEMBER PASSES A SECOND MEMBER USING PERMANENT MAGNETS WITH DIFFERENT STRENGTHS

Cross-reference to related applications or publications: "Electronics" magazine July 10, 1975, pages 100–105;

The present invention relates to apparatus wherein a pulse is generated when a first member passes a second member. It relates in particular to such apparatus as used in speed sensing or angle sensing equipment in internal combustion engines.

BACKGROUND AND PRIOR ART

In known apparatus which is utilized for the control of electronic ignition systems in internal combustion engines, a so-called double shield is utilized to shield the Wiegand wire from a first magnet and later from a second magnet. The Wiegand wire is thus subjected alternately to two magnetic fields of different polarity. The construction of such a shield is extremely difficult since its individual sectors must be precisely proportioned and arranged relative to each other.

THE INVENTION

It is an object of the present invention to furnish apparatus of the above-described type in which the shielding is more simple to construct and which is therefore much cheaper to manufacture.

According to the present invention, means, such as a Wiegand wire, are provided which generate a pulse when the direction of magnetization thereof is reversed. A first magnet applies a field having a first field strength and a first polarity to the pulse generating means, while a second magnet which generates a magnetic field having a second field strength exceeding said first field strength and a second polarity opposite said first polarity is also provided in operative proximity to the pulse generating means. Finally magnetic shielding is moved relative to the first and second magnet and the pulse generating means and shields the pulse generating means from the second magnetic field when in a first position and allows application of the first and second magnetic field when in a second position. Since application of the first and second magnetic field causes a superposition of the two fields which, since the second field is stronger than the first field, reverses the direction of polarization of the pulse generating means, a pulse is generated whenever the magnetic shielding is in the second position.

DRAWING ILLUSTRATING A PREFERRED EMBODIMENT

The single FIGURE shows a system according to the present invention utilizing two permanent magnets, a Wiegand wire, and shielding moving past the Wiegand wire.

Wiegand wires as such are known. They are described, for example, in the periodical "Electronics" of July 10, 1975, pages 100–105. As described therein, the domains of a polycrystalline material are polarized in a particular direction by a magnetic field. After the magnetic field is removed, the domains remain in this polarized condition. If now a magnetic field of reverse polarity is applied to the Wiegand wire, the domains will suddenly change their direction of polarization when the so-applied magnetic field exceeds a predetermined magnetic field strength. This reversal of polarization causes a sharp narrow pulse to be generated in a pick-up coil wound on the Wiegand wire, the amplitude of the pulse depending only on the speed of reversal of the domains within the wire. This property causes the Wiegand wire to be particularly suitable for use in speed or angle sensors, since the pulse induced in the pick-up coil has an amplitude which is independent of speed, that is pulses of sufficient amplitude can be generated even when the engine speed is very low.

The above-described effect is utilized in the sensor shown in the drawing. Two permanent magnets 1 and 2 have different magnetic polarity and field strengths. A Wiegand wire 3 is arranged in operative proximity of the two magnets and has a pick-up coil 4 wound thereon. Permanent magnets 1 and 2, Wiegand wire 3 and pick-up coil 4 together constitute the stator. The rotor is formed by a shielding 5 having individual segments 6, 7, 8 and 9. Shielding 5 with segments 6, 7, 8 and 9 is rotated so that the latter pass between Wiegand wire 3 and permanent magnet 1. Permanent magnet 1 is stronger than permanent magnet 2. If, therefore, in a first relative position one of the sectors 6-9 is positioned between permanent magnet 1 and Wiegand wire 3, the Wiegand wire is exposed only to the magnetic field of the weaker magnet 2. After shielding 5 has turned further so that the segment is no longer interposed between Wiegand wire 3 and permanent magnet 1, then the magnetic fields of the two permanent magnets are superimposed upon each other. The resultant magnetic field then has the polarity of the stronger permanent magnet 1. This polarity is, however, opposite to the polarity of weaker permanent magnet 2. Therefore the magnetic field applied to Wiegand wire 3 reverses its polarity. A pulse is induced in pick-up coil 4.

The periodic shielding from stronger permanent magnet 1 thus results in a field strength modulation at Wiegand wire 3 which causes pulses to be induced in pick-up coil 4 whose amplitude is independent of speed but whose spacing in time relative to one another depends on the width of segments 6-9 and therefore corresponds to predetermined angles of rotation.

Soft magnetic conductive pieces 10 mounted on magnets 1, 2 can be used to amplify the field or fields applied to the Wiegand wire thereby increasing the induction modulation effect.

The above-described sensor is extremely simple and inexpensive in its construction. Current carrying elements are arranged in the stator and the rotating element is particularly simple to manufacture. For example, it can simply be stamped out.

Various changes and modifications may be made within the scope of the inventive concepts.

We claim:

1. In apparatus for generating a pulse upon movement of a first member past a second member, said apparatus having means (3,4) for generating a pulse upon reversal of a magnetic field applied thereto, the improvement comprising
    first means (2) for applying a first magnetic field having a first field strength and a first polarity to said pulse generating means;
    second means (1) for applying a magnetic field having a second field strength exceeding said first field strength and a second polarity opposite said first polarity to said pulse generating means;

and magnetic shielding means (5) moving relative to said first and second magnetic field applying means and said pulse generating means for shielding said pulse generating means from said second magnetic field while permitting application of said first magnetic field when in a first position and for allowing application of said first and said second magnetic field to said pulse generating means when in a second position thereby creating a resultant magnetic field of opposite polarity to said first magnetic field in said pulse generating means so that said pulse generating means generates said pulse.

2. Apparatus as set forth in claim 1, wherein said pulse generating means comprises a Wiegand wire, and a pickup coil wound on said Wiegand wire.

3. Apparatus as set forth in claim 1, wherein said magnetic shielding means comprises a substantially cylindrical rotor (5) having a plurality of circumferential segments (6-9) each having a predetermined width spaced at predetermined angular increments from each other.

4. Apparatus as set forth in claim 1, further comprising a plurality of soft iron pieces affixed to said magnets (1,2) for increasing the magnetic field strength of said second or said first and second magnetic field applied to said pulse generating means.

5. Apparatus as set forth in claim 1, wherein said first and second magnetic field applying means each comprises a permanent magnet.

* * * * *